(No Model.)
C. Z. O'NEILL.
HAND CART.
No. 452,969. Patented May 26, 1891.
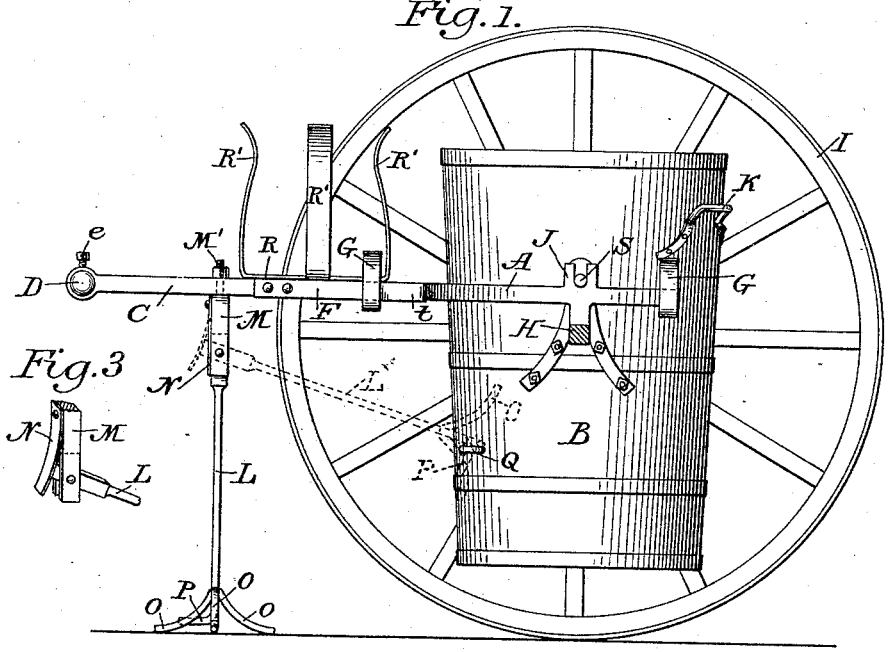
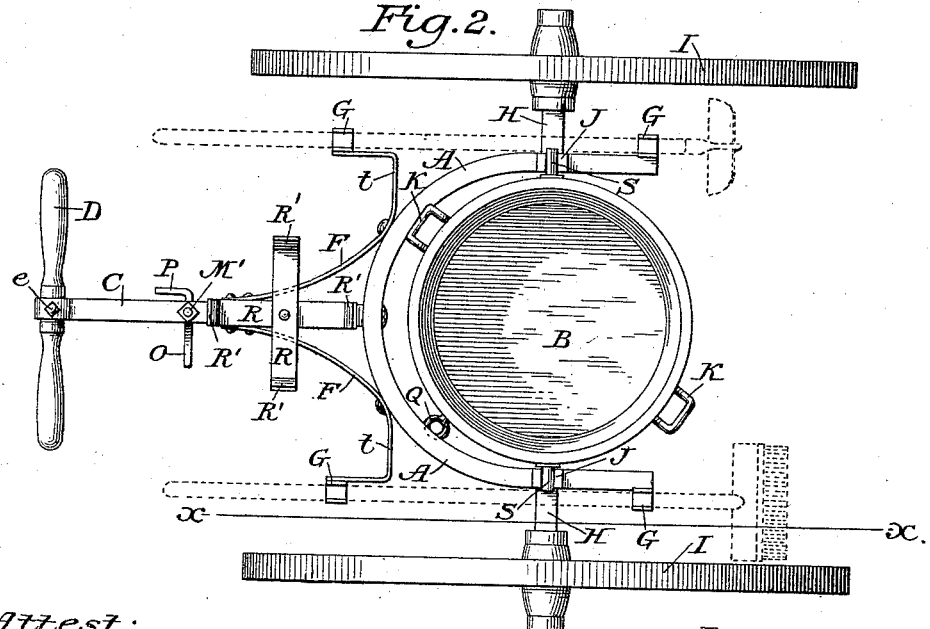
Attest:
A. N. Jesbera.
E. M. Watson.
Inventor:
Charles Z. O'Neill
By David A. Burr
Atty.

UNITED STATES PATENT OFFICE.

CHARLES Z. O'NEILL, OF NEW YORK, N. Y.

HAND-CART.

SPECIFICATION forming part of Letters Patent No. 452,969, dated May 26, 1891.

Application filed February 6, 1891. Serial No. 380,472. (No model.)

*To all whom it may concern:*

Be it known that I, CHARLES Z. O'NEILL, of the city, county, and State of New York, have invented certain new and useful Improvements in Street-Sweeping Hand-Carts; and I do hereby declare that the following is a full and exact description thereof, reference being had to the accompanying drawings, and to the letters of reference marked thereon, making a part of this specification.

My invention relates to improvements in street-sweeping hand-carts, and has for its object to increase the utility thereof.

It consists in the combination therewith, as hereinafter set forth and claimed, of devices for supporting the tongue of the cart and for suspending or supporting upon its frame the various tools or appliances needed for use in connection therewith.

In the accompanying drawings, Figure 1 is a side elevation of my improved street-sweeping hand-cart; Fig. 2, a top view thereof, and Fig. 3 a detail in perspective of the hinged joint for the supporting-leg.

A represents the frame of the cart, constructed of a curved bar bent upon a semicircular arc of sufficient radius to permit its two arms to embrace between them the cylindrical receptacle B, constituting the body of the cart.

The curved bar A is united at the middle thereof to a straight bar C, constituting the pole or tongue of the cart, and this tongue C is fitted at its outer end with a transverse handle D, preferably passed through an eye formed in the end of the tongue and made fast therein by a set-screw e. The tongue is strengthened by brace plates or strips F F, secured to each side of it, and extending thence diagonally, as shown in Fig. 2, to points on the curved bar A equidistant from the tongue. The ends of these brace plates or strips F F are extended beyond their points of attachment to the curved bar A, as shown at t t, each in a direction at a right angle with the length of the tongue C far enough to reach a plane parallel with the tongue and coincident with the ends of the curved bar A. The outer ends of the strips F F, as well as the ends of the curved bar A, are fitted with clasps G G, adapted to engage and hold the handle of the broom or hoe. These clasps are formed of elastic sheet-metal strips bent to form two upwardly-projecting fingers, between which the handle of the broom may be inserted, the bent strips being secured in position by bolts or rivets passed through the bent portion thereof.

The curved bar A is made to serve as an axle-tree for the cart by means of journals H H, which project outward from each arm of the bar at diametrically-opposite points, so as to be in a right line with each other. These journals may be formed integrally with the bar A, or secured thereto and extending in the same axial line serve as axles for the wheels I I, upon which the cart is mounted in the customary manner.

Immediately above each journal H an offset J is formed vertically in the frame and recessed to form a bearing for a pivotal stud or trunnion S, projecting from the periphery of the receptacle B. These trunnions are fitted and secured at diametrically-opposite points on the periphery of the receptacle B, so that it may swing on said trunnions and yet admit of being lifted out of the bearings and removed from the cart-frame.

The receptacle B is fitted with handles K K, secured thereto near to its top edge at diametrically-opposite points thereof, by means of which it may be readily lifted for the purpose of emptying the same. The tongue is supported by means of a leg L, hinged at its upper end in a forked bar M, made fast at its upper end to the under side of the tongue by a bolt M'. The end of the leg pivoted in the fork is rectangular in form, and a spring-plate N, secured at its upper end to the forked bar M above the recess therein, is extended down over the slot, so as to bear against the end of the leg above its pivot and operate to hold it in position at a right angle with the tongue, the spring being forced out when the leg is swung at an inclination therewith, as shown in Fig. 3 and in dotted lines in Fig. 1. The lower end of the leg is preferably divided into two or more feet or prongs O O (see Fig. 1) to afford it a firmer base, and also with a hook P, adapted to engage an eye Q on the lower end of the tub B, so as to brace the same when the cart is being moved from place to place.

A holder for a watering-pot or sprinkler is provided upon the top of the tongue by fixing thereon two intersecting strips R R of sheet metal, severally bent upward at each end to form elastic fingers R' R', whose inner ends are connected by the strips R R. These fingers serve to clasp and firmly hold the sprinkler inserted between them. Thus the cart, mounted on two wheels, is provided with a detachable swinging receptacle B for the street-sweepings, spring-holders on each side for the broom and hoe or shovel, a holder on the tongue for the watering-pot or sprinkler, and with a hinged leg by which the tongue is supported when the cart is stationary and which serves as a brace for the receptacle when it is in motion.

I claim as my invention—

1. The combination, with the frame and tongue of a hand-cart and with a detachable receptacle swinging on trunnions supported by said frame, of a leg pivoted in a forked bracket depending from the tongue, having a hook at its lower end to engage an eye in the swinging receptacle, and a spring bearing upon the leg to steady it when free, substantially in the manner and for the purpose herein set forth.

2. The combination, with the curved bar A and the tongue C in the frame of a street-sweeping hand-cart, of the lateral brace-bars F F, connecting the tongue and curved bar, and the elastic holders G G, carried upon said brace-bars and upon the ends of the curved bar in line parallel with the tongue to support the ends of a broom or hoe handle, substantially in the manner and for the purpose herein set forth.

3. The combination, with the tongue C, of a street-sweeping hand-cart, of the elastic holding-strips R R, made to intersect upon the tongue and having their ends bent upward to form clasping-fingers R' R', adapted to embrace a sprinkling-pot, substantially in the manner and for the purpose herein set forth.

In testimony whereof I have signed my name to this specification in the presence of two subscribing witnesses.

CHARLES Z. O'NEILL.

Witnesses:
  A. N. JESBERA,
  E. M. WATSON.